W. F. DOERFLING.
HEATING APPARATUS.
APPLICATION FILED APR. 4, 1921.
1,430,159.
Patented Sept. 26, 1922.
3 SHEETS—SHEET 2.
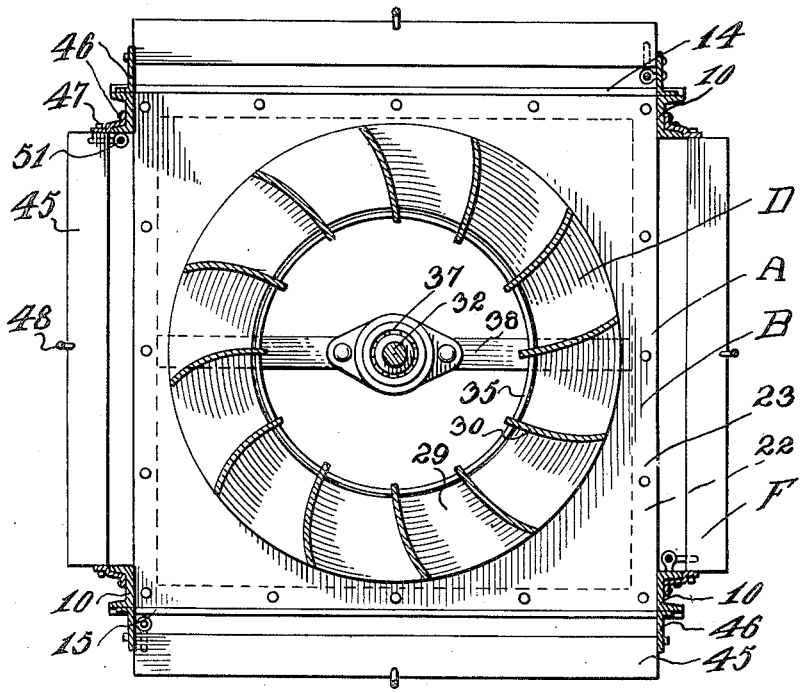
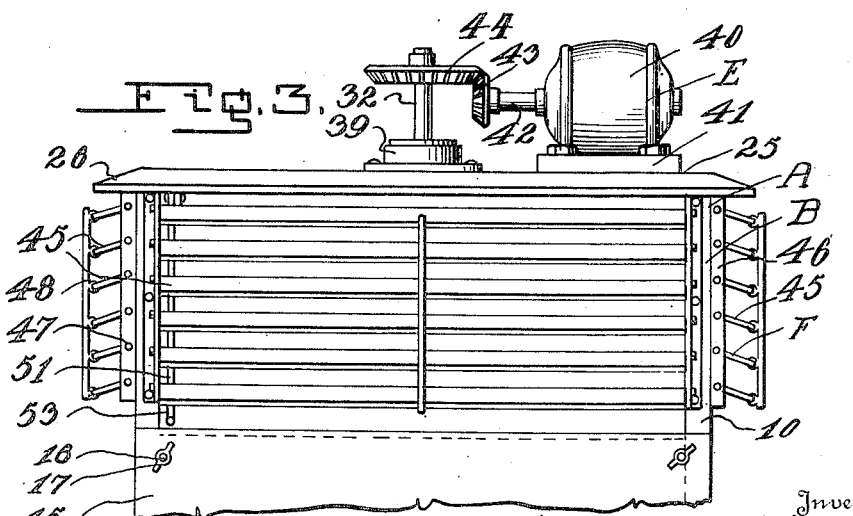
Inventor
William F. Doerfling
By Lancaster and Allwine
Attorney

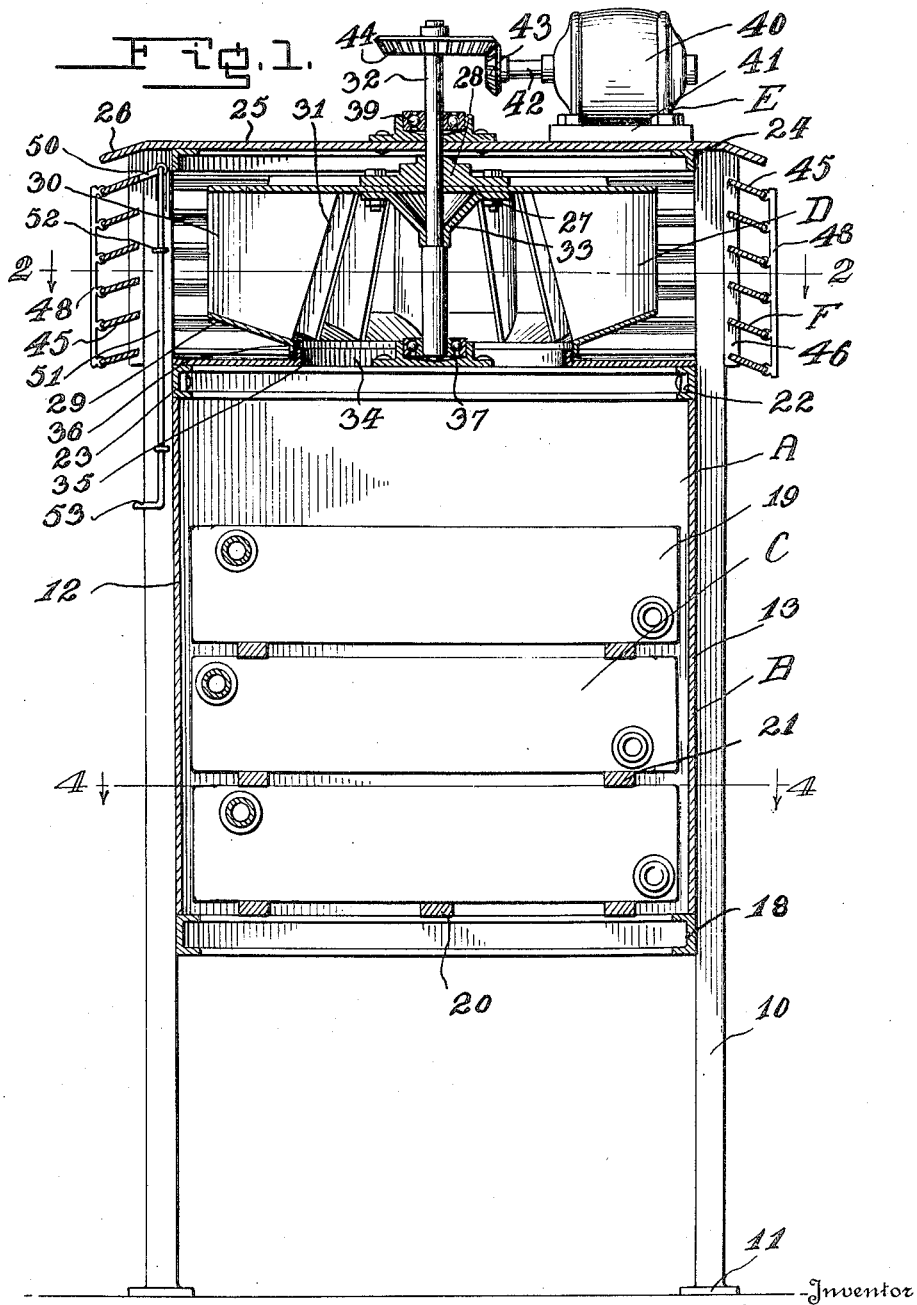

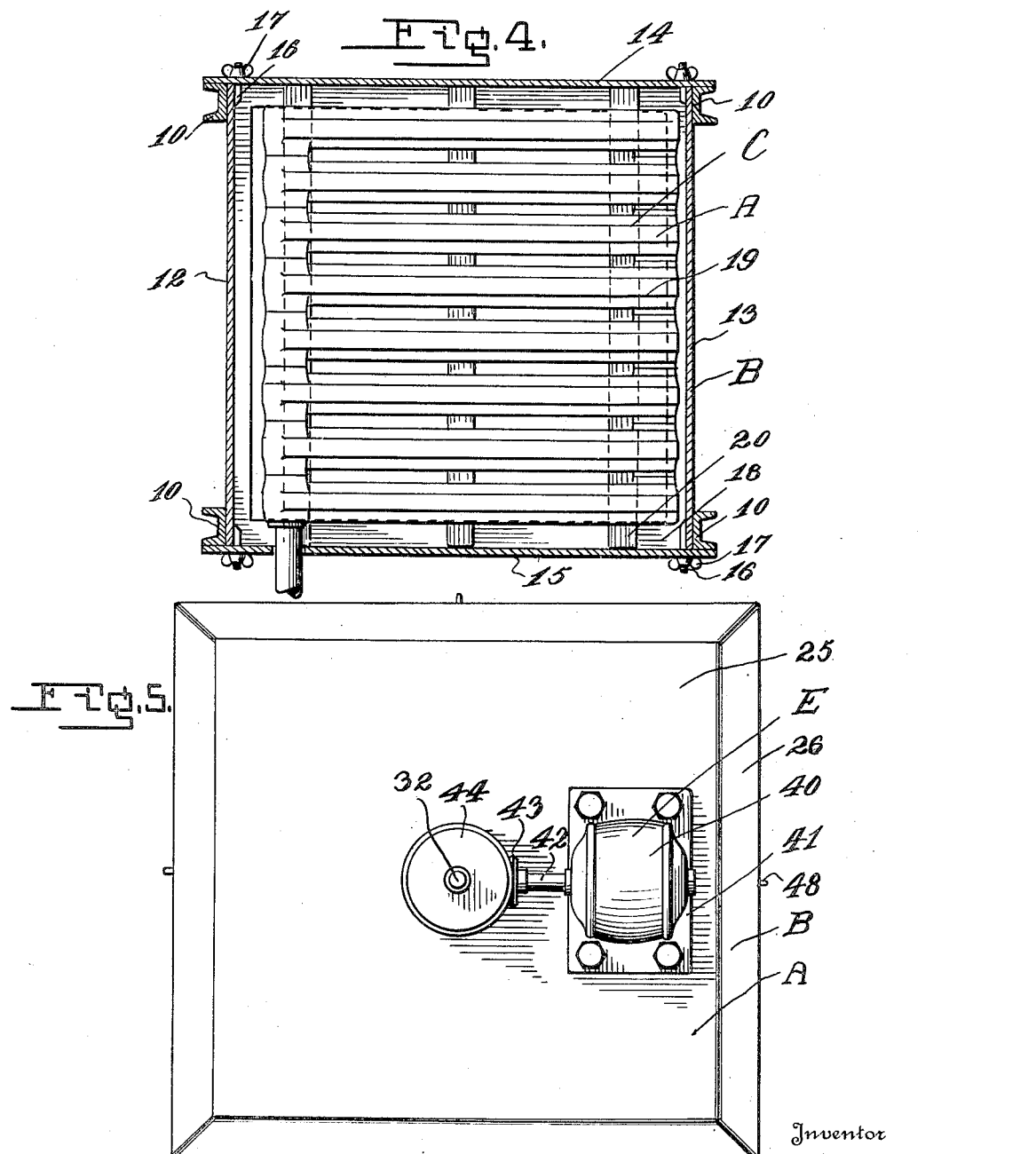

Patented Sept. 26, 1922.

1,430,159

UNITED STATES PATENT OFFICE.

WILLIAM F. DOERFLING, OF GALT, ONTARIO, CANADA.

HEATING APPARATUS.

Application filed April 4, 1921. Serial No. 458,580.

*To all whom it may concern:*

Be it known that I, WILLIAM F. DOERFLING, subject of the King of Great Britain, residing at Galt, in the Province of Ontario and Dominion of Canada, have invented certain new and useful Improvements in Heating Apparatus, of which the following is a specification.

This invention relates to heating and cooling apparatuses for large buildings, such as industrial plants, theatres, railway terminals and the like, and the primary object of the invention is to provide a novel means for effectively distributing the heated or cooled air so that the maximum amount of benefit will be derived therefrom.

While, as stated, the invention relates to heating or cooling apparatuses, hereinafter the improved device will be merely termed a heating apparatus, as the same is primarily intended to be used as such.

Heating systems are generally of three classes, first steam heating systems employing coils or radiators placed along outer walls or at the ceilings or floors, second, vacuum or vapor heating systems, employing coils or radiators, located as mentioned above, and third, fan systems or blower heating systems, which consists of a bank of heating coils, a fan or blower for handling the air, and a system of galvanized iron ducts for the purpose of conveying the heated air throughout the space to be heated. All of these above systems, will give results to a certain extent, but the same are expensive to install, and are not economical to maintain, and do not thoroughly distribute the heat. In the fan system, the series of galvanized iron ducts are extremely expensive, and it is a prime object of my invention to provide a unit heating apparatus embodying a fan or air distributing propeller, which absolutely eliminates the necessity of providing expensive air conveying ducts.

Another object of the invention is to provide a novel heating apparatus, which can be installed at a small initial cost, and which will be economical to operate and maintain, and which will give quick service and maintain an even temperature and accomplish perfect ventilation.

A still further object of the invention is to provide a novel heating apparatus embodying a casing for receiving or supporting the heating or cooling medium, and a novel type of fan, arranged in a novel manner in relation to the heating or cooling medium for effectively distributing the air at all points throughout the room or building in which it is placed.

A further object of the invention is to provide a novel combined guard and deflector for the fan or blower, so as to prevent the accidental contacting of foreign matter with the fan, and for throwing the air toward the floor when so desired.

A still further object of the invention is to provide a novel means for operating the fan or blower, whereby the same can be operated by an external motor or belt system, so that repairs can be readily made to the motor or to the belt system.

With these and other objects in view, the invention consists in the novel construction, arrangement and formation of parts, as will be hereinafter more specifically described, claimed and illustrated in the accompanying drawings forming a part of this specification, in which:

Figure 1 is a vertical central section through the unit heating apparatus.

Figure 2 is a horizontal section through the improved apparatus taken on the line 2—2 of Figure 1.

Figure 3 is a fragmentary elevation of the improved unit heating apparatus showing the novel type of guard and heated air deflector utilized therewith.

Figure 4 is a horizontal section taken through the lower portion of the unit heater on the line 4—4 of Fiure 1, and Figure 5 is a top plan view of the improved unit heater.

Referring to the drawings in detail, wherein similar reference characters designate corresponding parts throughout the several views, the letter A indicates the unit heater, which includes the frame and casing B, for the heating or cooling unit C; D, the fan wheel for distributing the heated or cooled air; E, the means for operating the fan wheel; and F, the guard and deflector for the fan wheel and the heated and cooled air.

The frame and casing or housing B can be constructed in any preferred manner, and of any preferred material, and one form thereof has been shown in the accompanying drawings. As shown the frame and casing B includes the four corner standards 10, which are preferably formed of channel beams or the like, and the lower ends of these standards may be provided with enlarged supporting feet 11. These feet can be bolted, riveted or otherwise secured to the floor of the building with which the heater is used if so desired. Side plates 12 and 13 are secured to the inner surface of the channel beam standards 10 and these side plates 12 and 13 may support the front and rear plates 14 and 15. If so desired, the front and rear plates may be so mounted as to permit the removal thereof, so as to facilitate the mounting of the heating or cooling medium C within the casing. As shown, the side plates 12 and 13 support outwardly extending threaded stems 16, which are adapted to extend through the front and rear plates 14 and 15 and are adapted to have mounted thereon winged nuts 17, which are adapted to impinge against the outer surface of the plates. These plates 12, 13, 14 and 15 form the housing for the heating and cooling medium C and terminate short of the upper and lower ends of the standards 10. The channel beam standards 10 have secured thereto in any preferred manner at the lower edges of the plates, which form the housing or casing, horizontally disposed bracing channel beams 18, and these beams form the support for the heating and cooling medium C.

As shown the heating or cooling medium C comprises a plurality of horizontally disposed superposed arranged radiators 19, but it is to be understood that heating coils may be substituted therefor if so desired. In fact individual heating plants may be used in the casing, such as electric heaters, hot air furnaces or the like, but it is desired that ordinary radiators 19 be utilized, and connected with a central heating plant. These radiators 19 are connected to the central heating plant in the ordinary manner, and are held in proper position within the casing, by means of transversely extending strips 20. These strips 20 rest upon the channel beams 18. Spacer strips 21 also may be utilized for holding the radiators in spaced relation.

While three radiators have been shown, it is to be understood that more or less may be utilized, when necessary or desirable. Directly above the plates forming the housing or casing, horizontally disposed channel beams 22 are arranged, which form means for supporting the housing for the fan wheel D, which will be now described. The upper edges of the horizontally disposed beams 22 support a horizontally disposed wall or plate 23, which forms the bottom wall for the housing of the fan wheel D. In reality, this plate 23 forms a partition for dividing the device into the housing for the heating and cooling medium, and the housing for the fan wheel D. Horizontally disposed angle strips 24 are secured to the extreme upper ends of the standards 10, and these angle strips support a top wall 25. The edges of the top wall 25 extend beyond the standards 10, and are inclined downwardly at an angle, as at 26, for a purpose, which will be hereinafter more fully described.

The fan wheel D is arranged intermediate the plate 23 and the top wall 25, and includes a top disc plate 27, which has connected thereto the hub 28, and an annular inclined lower plate 29. The plate 27 and the lower inclined annular plate 29 support the fan blades 30, which have their inner edges inclined inwardly as at 31 and each of these blades is curved arcuately throughout its length, and they are adapted to suck in the air from the casing for the heating or cooling medium and to throw the air outwardly tangentially therefrom in all directions. The hub 27 is keyed or otherwise secured to a vertically disposed shaft 32 and includes an inverted conical member 33, which is also adapted to direct the air to the blades 30. The lower plate 23 is provided with an enlarged axial opening 34, and the inner edge of this plate is provided with an upstanding collar 35, which is adapted to engage the inner surface of a depending annular flange 36, formed on the inner edge of the inclined annular lower plate 29 of the fan wheel D. Arranged at the axial center of the opening 34, is a thrust bearing 37, which is mounted upon a suitable transversely extending brace strip 38, which may be, if so desired, secured to the channel beams 22. The upper or top wall 25 also supports a bearing 39, and the shaft 32 is rotatably mounted in these bearings. The shaft 32 is adapted to be driven in any preferred manner, and may have keyed thereto a suitable pulley wheel, around which may be trained a drive pulley belt, which can be driven from a suitable line shaft, if so desired.

As shown in the drawings, the means E for driving the shaft 32 comprises an electric motor 40 of the ordinary or any preferred construction, which is mounted upon the base 41. The base 41 is, in turn, secured to the upper surface of the top wall 25, and the armature shaft 42 of this motor has secured thereto a bevelled pinion 43, which meshes with a relatively large bevelled gear wheel 44, which in turn is keyed or otherwise secured to the shaft 32. Thus it can be seen that the fan wheel is driven in a convenient manner from the motor 40. By positioning the motor 40 externally of the casing, the same can be readily gotten to, when repairs or the like are desired to be made thereto.

The improved guard F for the fan wheel and the deflector for the air current comprises a plurality of shutter blades 45, which are pivotally connected at their inner edges to suitable vertically disposed bars 46, as at 47. These bars 46 may be secured to the outer surface of the channel beams 10. The shutter blades 45 are operatively connected together by means of the connecting rod 48, so that all of the blades will be moved synchronously. The uppermost blade 45 of each set of the shutter blades arranged at each side of the fan wheel casing is provided with an inwardly extending ear 50, which is disposed inwardly of the pivot point of the shutter blades. Each one of these ears 50 has pivotally connected thereto the upper end of the operating rod 51. These rods 51 are slidably mounted in suitable guide ways 52, and the lower ends thereof may be provided with suitable operating handles 53. While the shutter blades 45 are adapted to be held in their adjusted positions by friction, it is to be understood that any suitable type of lock may be provided for the rods 51 if so desired, for holding the same in an adjusted position.

It can be seen that when the shutter blades 45 are disposed in a direct horizontal plane, the heated or cooled air will be thrown outwardly, horizontally at all angles, from the improved heater, and when the blades are inclined downwardly at an angle to the horizontal, the heated or cooled air will be thrown downwardly toward the floor. The heated or cooled air also can be directed upwardly, if so desired, by inclining the shutter blades 45 upwardly, at an incline to the horizontal. The inclined extensions 26 formed on the top wall 25, also form means for deflecting the air downwardly toward the floor, as it is most desirable that the heated air be directed toward the floor, so as to heat the cooled air which generally lies close to the floor. It can be seen that each set of the shutter blades on each side of the casing are independently adjustable, thereby permitting the air currents on one side to be diverted downwardly, while the air currents on the other side can be diverted directly outwardly or upwardly if so desired.

In use of the improved heating unit, a plurality of the same are arranged at the desired points in the building to be heated, and it can be seen that the cool air will be sucked in from the bottom of the casing and permitted to circulate around the radiators 19 and then will be drawn and thrown outwardly from the casing at all angles and, on all sides thereof.

From the foregoing description, it can be seen that a novel heating appliance has been provided of exceptionally simple and durable character, which will permit the effective distributing of heated or cooled air through a large building, without necessitating the use of large air ducts or the like.

Changes in details may be made, without departing from the spirit or scope of this invention; but,

I claim:

1. In a heating or cooling apparatus, a casing, a partition disposed adjacent to the upper end of the casing having an axial opening therein a temperature changing means disposed within the casing adjacent to one end thereof, a vertically disposed fan wheel arranged in the casing on the opposite side of the partition from the temperature changing means to draw the air from around said temperature changing means to discharge the same tangentially to the periphery of the fan wheel, an annular flange formed on the partition wall around the opening in the partition, and a flange of annular configuration formed on the fan wheel arranged to engage the first mentioned flange.

2. In a heating apparatus, a casing having a lower open end, a partition arranged within the casing having an air exit opening, a top wall for the casing, a heat radiating medium arranged within the casing below the partition and adjacent to the open end of the casing, a fan wheel arranged within the casing intermediate the partition and the top wall, the side walls of the casing being provided with outlet openings intermediate the partition and the top wall, means for operating the fan wheel, and guard shutters for controlling the path of the air forced out from the casing.

3. In a unitary heating apparatus, a casing having one end thereof open, a partition arranged in the casing adjacent to its upper end having an axial outlet opening, and a top wall arranged in spaced relation to the partition, a heat radiating unit arranged within the casing at one side of the partition, a fan wheel arranged in the casing on the opposite side of the partition having a vertically disposed shaft arranged to suck the air in through said exit opening and throw the same outwardly tangentially to the periphery of the fan wheel, and shutter blades carried by the sides of the casing for deflecting the air forced out of the casing by the fan wheel and for forming a guard for the fan wheel.

4. In a unitary heating apparatus, a vertically disposed casing having a lower open end, a partition wall, and a top wall, side plates for the casing terminating at the partition, a heat radiating unit arranged within the casing below the partition wall, the partition having an axial air escape opening therein, a fan wheel arranged on the upper side of the partition having a vertically disposed shaft, and a motor mounted externally of the casing for driving said vertically disposed shaft.

5. In a unitary heating apparatus, a casing comprising a plurality of corner standards, side plates carried by the corner standards, a partition plate arranged at the upper edges of the side plates having a central axial opening, a top wall carried by the upper ends of the standards, a heat radiating unit arranged in the casing below the partition, a fan wheel arranged in the casing intermediate the partition plate and the top wall including a vertically disposed shaft, a top plate carried by the shaft, an annular lower plate, and a plurality of connecting arcuately curved fan blades, the fan wheel being so constructed as to suck the air into the hub portion thereof and to throw the same outwardly tangentially to the periphery thereof, and a motor mounted externally of the casing for rotating said shaft.

6. In a unitary heating apparatus, a casing including a plurality of vertically disposed standards, side plates secured to the standards, a partition wall carried by the standards and arranged at the upper edge of the side plates, a top wall carried by the standards, the partition wall having an axial opening, a heat radiating unit arranged within the casing, a fan wheel arranged intermediate the top wall and the partition plate, a plurality of pivoted shutter blades arranged on each side of the casing, means pivotally securing the shutter blades in position, means pivotally connecting the blades together, and means for varying the inclination of said blades.

7. In a unitary heating or cooling apparatus, a vertically disposed casing including corner standards, a top wall carried by the standards, a partition plate arranged below the top wall having an axial opening therein, side plates carried by the standards arranged below the partition plate, a temperature changing means arranged within the casing below the partition plate, a fan wheel arranged in the casing intermediate the partition plate and the top wall, means for operating the fan wheel, and downwardly inclined flanges formed on the top wall extending beyond the plane of the side plates.

8. In a unitary heating apparatus, a casing including corner standards, connecting beams for the standards, a partition plate carried by the standards and arranged intermediate the ends thereof, a top wall carried by the standards arranged in spaced relation to the partition plate, the partition plate having an axial opening therein, side plates carried by the standards and terminating at the partition plate, a plurality of superposed radiators arranged within the casing below the partition plate and supported by said connecting beams, a fan wheel arranged in the casing intermediate the partition plate and the top wall, and a guard carried by the casing for said fan wheel.

WILLIAM F. DOERFLING.